United States Patent [19]

Kojima et al.

[11] Patent Number: 4,463,144
[45] Date of Patent: Jul. 31, 1984

[54] PROCESS FOR PRODUCING PROPYLENE-TETRAFLUOROETHYLENE COPOLYMER

[75] Inventors: Gen Kojima, Machida; Michio Hisasue, Yokohama, both of Japan

[73] Assignee: Asahi Glass Company Ltd., Tokyo, Japan

[21] Appl. No.: 357,812

[22] Filed: Mar. 15, 1982

Related U.S. Application Data

[63] Continuation-in-part of Ser. No. 185,744, Sep. 10, 1980, abandoned.

[51] Int. Cl.$^3$ ............................ C08F 2/26; C08F 4/40
[52] U.S. Cl. ...................................... 526/94; 526/255; 526/915
[58] Field of Search ...................................... 526/93, 94

[56] References Cited

U.S. PATENT DOCUMENTS 3,337,515  8/1967  La Heij ................................ 526/93
3,403,137  9/1968  Anderson ............................. 526/93
3,467,635  9/1969  Brasen ................................. 526/255
4,277,586  7/1981  Ukihashi .............................. 526/93

FOREIGN PATENT DOCUMENTS 553813  3/1958  Canada ............................... 526/255

*Primary Examiner*—C. A. Henderson
*Attorney, Agent, or Firm*—Oblon, Fisher, Spivak, McClelland & Maier

[57] ABSTRACT

A propylene-tetrafluoroethylene copolymer is produced by copolymerizing propylene and tetrafluoroethylene in a molar ratio ranging from 95/5 to 40/60 in an aqueous medium containing tertiary butanol ranging from 5 to 30 wt.%, an emulsifier ranging from 0.01 to 10 wt.% and a redox catalyst of a combination of (1) a water soluble persulfate, (2) a water soluble iron salt, (3) a hydroxymethanesulfinate and (4) ethylenediaminetetraacetic acid or a salt thereof at pH of 8 to 10.5 and at a temperature of 0° to 50° C.

12 Claims, No Drawings

PROCESS FOR PRODUCING PROPYLENE-TETRAFLUOROETHYLENE COPOLYMER

This application is a continuation-in-part of application Ser. No. 185,744 filed Sept. 10, 1980, now abandoned.

BACKGROUND OF THE INVENTION

1. Field of the Invention

The present invention relates to a process for producing a propylene-tetrafluoroethylene copolymer. More particularly, it relates to a novel process for producing the propylene-tetrafluoroethylene copolymer by copolymerizing propylene and tetrafluoroethylene in an aqueous medium containing a specific amount of tertiary butanol and an emulsifier in the presence of a specific redox catalyst to attain smooth copolymerization at high polymerization velocity without discoloring the latex or the copolymer and with high storage stability of the latex.

2. Description of the Prior Art

It has been known that propylene-tetrafluoroethylene copolymers are vulcanizable elastic polymers having excellent heat resistant and chemical resistance.

The copolymerizations of propylene and tetrafluoroethylene in an aqueous medium have been known as disclosed in Japanese Examined patent publication No. 19188/1965, and No. 4115/1978 and U.S. Pat. No. 3,467,635. It has been also proposed that the propylene-tetrafluoroethylene copolymer having high molecular weight can be obtained by copolymerization at a relatively low temperature at 0° to 50° C. if a redox catalyst comprising a water soluble persulfate/a water soluble thiosulfate or sulfite/a water soluble iron salt as a catalyst for the copolymerization in an aqueous medium, as disclosed in British Pat. No. 1,456,615.

On the other hand, many redox catalysts for emulsion polymerization at a lower temperatures have been known for a long time. In many instances the catalyst activity is specifically dependent upon the combination of a given redox catalyst with a given monomer to be polymerized. The limitation for the selection is severer in the case of multi-component copolymerization and is related to various factors such as reactivity of monomer, efficiency for initiation, chain transfer, kinetic chain length, pH of the medium and stabilities of the monomer and the catalyst. Therefore, it is not easy to find an optimum redox catalyst for a specific polymerization system. In the case of the copolymerization system having high chain transfer activity and short kinetic chain length such as a copolymerization of propylene and tetrafluoroethylene, the selection of an optimum redox catalyst is especially difficult. For example, most catalysts having high catalytic activity for the emulsion polymerizations of tetrafluoroethylene at a low temperature are not active for copolymerization of propylene and tetrafluoroethylene at a low temperature.

According to the inventor's studies, the specific redox catalysts disclosed in British Pat. No. 1,456,615 are active for the copolymerization of propylene and tetrafluoroethylene at a low temperature, however, the copolymerizations at a low temperature with such catalyst have the following disadvantages.

Firstly, the copolymerization velocity is not high enough to be upto about 17 g./l.hr. The discoloring (dark-coloring) of the latex and the polymer is remarkably severe even after the complicated step of a long time for the washing because of the use of the activating solution containing a reducing sugar. Moreover, COD of the waste solution from the step of the coaggulation of the latex and the washing is remarkably high and accordingly, it is remarkably disadvantages in view of the treatment of the waste solution. Furthermore, the storage stability of the latex is insufficient with the result being the sedimentation and separation of the latex upon long storage or because the reducing sugar is perishable the latex can become discolored and have a bad smell. The preparation of the activated solution is complicated and the activated solution is immediately inactivated upon contact with oxygen in air. Therefore, the preparation is not easy and the catalytic activity is not stable.

SUMMARY OF THE INVENTION

It is an object of the present invention to overcome the above-mentioned disadvantages in a copolymerization of propylene and tetrafluoroethylene at a low temperature in an aqueous medium.

The foregoing and other objects of the present invention have been attained by providing a process for producing a propylenetetrafluoroethylene copolymer by copolymerizing propylene and tetrafluoroethylene in an aqueous medium containing 5 to 30 wt.% of tertiary butanol and 0.01 to 10 wt.% of an emulsifier in the presence of a redox catalyst comprising (1) a water soluble persulfate, (2) a water soluble iron salt, (3) a hydroxymethanesulfinate and (4) an ethylenediaminetetraacetic acid or a salt thereof at pH of 8.0 to 10.5.

DETAILED DESCRIPTION OF THE PREFERRED EMBODIMENTS

The inventors have studied copolymerizations of propylene and tetrafluoroethylene in an aqueous medium at a low temperature, which had not been easily performed, so as to overcome the above-mentioned disadvantages in the process. As a result, the following fact has been found. The specific redox catalyst of the combination of (1) a water soluble persulfate, (2) a water soluble iron salt, (3) a hydroxymethanesulfinate and (4) ethylenediaminetetraacetic acid or a salt thereof (EDTA), is effective to attain this purpose and the specific redox catalyst has high catalytic activity in an alkaline aqueous solution containing a specific amount of tertiary butanol and an emulsifier at pH of upto 10.5.

In accordance with the present invention, it is possible to copolymerize propylene and tetrafluoroethylene at high copolymerization velocity in an aqueous medium. Thus, the copolymerization can be smoothly performed at a low temperature such as lower than 40° C. and the propylenetetrafluoroethylene copolymer having high molecular weight can be obtained. In accordance with the process of the present invention, the smooth copolymerization in an aqueous medium is attained and the stability of the resulting latex is excellent. The discoloring of the latex and the polymer is not caused and COD of the waste solution can be remarkably reduced. The copolymerization can be continued for a long time by continuously adding the hydroxymethanesulfinate as a reducing agent. The copolymerization velocity can be controlled as desired by adjusting the amount of the hydroxymethanesulfinate, etc.

In the process of the present invention, when the content of $C_2F_4$ is larger, the copolymerization velocity is faster and the copolymer having high molecular weight is effectively produced. Therefore, the molar ratio of $C_2F_4/C_3H_6$ is in the range of 95/5 to 40/60 preferably 93/7 to 70/30. In the process of the present invention, it is possible to copolymerize $C_2F_4$ and $C_3H_6$ as the major components with one or more other comonomers, which make a multi-component polymer for the proper object.

In the process of the present invention, various components for the specific redox catalyst can be used.

Suitable water soluble persulfates as the first component include ammonium or alkali metal salts such as ammonium persulfate, potassium persulfate and sodium persulfate.

Suitable water soluble iron salts as the second component include divalent or trivalent iron salts such as ferrous sulfate, ferric sulfate, ferrous nitrate, ferric nitrate, ferrous chloride, ferric chloride, ammonium ferrous sulfate, and ammonium ferric sulfate. The ferric or ferrous sulfate is especially preferable as the second component.

The first and second components are combined with a hydroxymethanesulfinate (referring to as HMSA) such as $CH_2(OH)SO_2Na$ and ethylenediaminetetraacetic acid or a salt thereof (referring to EDTA).

EDTA is preferably disodium salt and, the other salts or hydrate or ethylenediaminetetraacetic acid itself can be used.

HMSA is preferably an alkali metal salt such as sodium or potassium salt thereof. It is possible to be a hydrate thereof or to contain a small amount of hydroxymethanesulfonate.

The ratios of the components of the specific redox catalyst used in the present invention can be selected as desired.

The following facts are found. With regard to the copolymerization velocity depending on the catalytic component content, the water soluble persulfate content causes little influence, but the iron ion content and HMSA content cause much influence. EDTA has high chelate forming stability with iron ion and EDTA is used for resulting effective iron ion concentration as the catalytic component. Therefore, EDTA is incorporated at an equivalent concentration to the iron ion concentration in the optimum condition.

In usual, the water soluble persulfate is incorporated at a concentration of 1 to 50 m mol/liter; the water soluble iron salt and EDTA are respectively incorporated at concentration of 0.05 to 5 m mol/liter; and HMSA is incorporated at a concentration of 0.5 to 50 m mol/liter in the aqueous medium. When the concentrations of the water soluble iron salt and EDTA are set in relatively high level, the concentration of HMSA can be set in relatively low level, and vice versa.

In order to give a desired copolymerization velocity, the concentrations of the components can be controlled as desired.

The specific redox catalyst used in the present invention is usually used at a concentration of 0.001 to 5 wt.% preferably 0.01 to 2 wt.% based on the aqueous medium. The content of the specific redox catalyst can be greater than the range, and there is tendency to decrease the molecular weight of the resulting copolymer and it is economically disadvantageous. It is preferably to select the concentration from said range.

In the process of the present invention, the aqueous medium contains 5 to 30 wt.% preferably 8 to 15 wt.% of tertiary butanol as an accelerator. In addition to the known effect of increasing the polyemrization velocity, the tertiary butanol was found to exhibit some unexpected effects such as to increase the reproducibility of the copolymer, the molecular weight of the copolymer and the stability of the resulting latex, in the tetrafluoroethylene-propylene emulsion polymerization system. If the amount of tertiary butanol is less than 5 wt.%, no adequate effects are obtainable. On the other hand, if the amount exceeds 30 wt.%, the copolymerization velocity tends to decrease and the stability of the resulting latex tends to be degraded.

The copolymerization is usually carried out at a relatively low temperature such as 0° to 50° C. If a reaction temperature is too high, the molecular weight of the resulting copolymer is lowering and the decomposing velocity of the catalyst is too fast and accordingly, the efficiency is lower. If a reaction temperature is too low, the copolymerization velocity is too low to attain a practical operation. The reaction temperature is preferably in a range of about 5° to 45° C. especially about 10° to 40° C.

The pH dependency of the copolymerization velocity is high as the characteristic of the copolymerization of the present invention. Thus, pH is in a range of 8 to 10.5 preferably 8.5 to 10.5. If pH is out of the range, the copolymerization velocity is low. If pH if higher than 10.5, the copolymerization does not virtually proceed.

In the process of the present invention, the other condition for the copolymerization is not critical and it is possible to employ a batch operation or a continuous operation under stirring.

The pressure in the copolymerization is not critical but relatively low pressure such as less than 100 kg./cm² (gauge), preferably in a range of 5 to 80 kg./cm² (gauge), especially 10 to 50 kg./cm² (gauge) is satisfactorily applied.

In the process of the present invention, an emulsifier required for an emulsion polymerization is used.

Suitable emulsifiers include conventional polyfluoro- or polyfluorochloro-alkyl type emulsifiers such as water soluble salts of polyfluoroaliphatic carboxylic acids and perfluoroaliphatic carboxylic acids and water soluble salts of polyfluorochloroaliphatic carboxylic acids or perfluorochloroaliphatic carboxylic acids and phosphates or sulfates of polyfluoroalcohols. It is also possible to use non-fluorinated emulsifiers such as sulfates of higher fatty alcohol or water soluble salts of aromatic sulfonic acids. A mixture of the emulsifiers can be used. The emulsifier is used at a concentration of about 0.01 to 10 wt.% preferably about 0.1 to 5 wt.% based on the aqueous medium. It is also possible to incorporate a pH regulator, a buffering agent, and a chain transfer agent.

In the process of the present invention, the copolymerization is carried out in a weak alkaline condition (pH of 8 to 10.5) in view of copolymerization velocity. It is suitable to incorporate a pH regulator such as sodium hydroxide, potassium hydroxide, ammonium hydroxide and others, and a buffering agent such as sodium hydrogenphosphate, sodium borate and others.

In accordance with the process of the present invention, the product is obtained in a form of a dispersion (latex). The propylenetetrafluoroethylene copolymer having elasticity can be easily separated from such dispersion by a conventional manner or a well-known manner. It is also possible to use the product in the form of a dispersion as obtained or a concentrated dispersion, in an operation for fabrication.

The resulting copolymer has advantages of non-discoloring and excellent electric properties, chemical resistance, heat resistance and mechanical properties. The copolymer can be used for various usages in view of these characteristics.

The present invention will be illustrated by certain examples and references which are provided for purposes of illustration only and are not intended to be limiting the present invention.

EXAMPLE 1

In a 100 ml. stainless steel ampoule, (pressure resistance of 50 kg./cm$^2$), 40 g. of deionized water, 5 g. of tert-butanol, 0.5 g. of $C_8F_{17}COONH_4$, 1.0 g. of $Na_2HPO_4.12H_2O$, and 0.1 g. of NaOH were charged and then, 0.5 g. of ammonium persulfate dissolved in a small amount of water was added. The ampoule was cooled with liquid nitrogen, and 5 g. of an aqueous solution containing 0.0075 g. of $FeSO_4.7H_2O$, 0.009 g. of EDTA (disodium salt of ethylenediaminetetraacetic acid dihydrate) and 0.04 g. of $CH_2(OH)SO_2Na$ was charged and the ampoule was evacuated. The aqueous medium containing the catalyst had pH of 9.1. Into the ampoule, 8.2 g. of a mixed gas of propylene and tetrafluoroethylene (molar ratio of $C_2F_4/C_3H_6$ of 85/15) was fed and the ampoule was vibrated in a constant temperature vessel at 25° C. to carry out the copolymerization. As a result, propylene-tetrafluoroethylene copolymer having a molecular weight of 133,000 and a molar ratio of $C_2F_4/C_3H_6$ of 55/45 was obtained at a copolymerization velocity of 120 g./l.hr.

EXAMPLES 2 TO 4 AND REFERENCES 1 AND 2

In accordance with the process of Example 1 except varying kinds and amounts of the pH regulator and the buffering agent ($NaHPO_4.12H_2O$, NaOH etc.) to change pH of the aqueous medium containing the catalyst as shown in Table 1, each copolymerization was carried out.

The copolymerization velocities resulted by these copolymerizations are shown in Table 1.

TABLE 1

|  | pH | Copolymerization velocity (g./l. hr.) |
| --- | --- | --- |
| Reference 1 | 5.5 | 4.5 |
| Example 2 | 8.5 | 60 |
| Example 3 | 9.7 | 120 |
| Example 4 | 10.5 | 110 |
| Reference 2 | 10.8 | 1.8 |

EXAMPLE 5

In a 2 liter stainless steel autoclave having pressure resistance of 50 kg./cm$^2$ equipped with a stirrer and a jacket, 1014 g. of deionized water, 116 g. of tert-butanol, 5.8 g. of $C_8F_{17}COONH_4$, 34.8 g. of $Na_2HPO_4.12H_2O$ and 2.5 g. of NaOH were charged and then, 11.6 g. of ammonium persulfate was added. An aqueous solution of 0.058 g. of $FeSO_4.7H_2O$, 0.069 g. of EDTA in 50 g. of water was added and the autoclave was closed and evacuated to be a reduced pressure and nitrogen gas was fed to a pressure of 30 kg./cm$^2$ to purge it. The autoclave was evacuated to show reduced pressure and was maintained at 22° C. Into the autoclave, 139 g. of $C_2F_4$ monomer and 7 g. of $C_3H_6$ monomer (molar ratio of $C_2F_4/C_3H_6$ of 93/7) were fed and then, a deionized water solution containing 8.7 wt.% of $CH_2(OH)SO_2Na$ and 1 wt.% of NaOH was fed into the autoclave by a constant volumetric pump at a rate of 2.4 ml./hour (pH of 9.5). A mixed gas of propylene and tetrafluoroethylene (molar ratio of 56/44) was continuously fed so as to compensate the reduction of the pressure in the autoclave. The pressure in the reactor was 25 kg./cm$^2$. After 12 hours for the reaction, a latex having a concentration of the polymer of 25.6 wt.% was obtained at a selectivity of 99.3% and 397 g. of the polymer was separated. An average copolymerization velocity was 28.7 g./l.hr. The resulting latex had pH of 8.5 and was a stable white latex. The polymer separated by the addition of an aqueous solution of calcium chloride was a white spongy polymer having a $C_2F_4$ content of 56.5 mol.% and a molecular weight of 202,000.

EXAMPLES 6 TO 7

In accordance with the process of Example 5, except varying a molar ratio of $C_2F_4/C_3H_6$ (initial charge), a molar ratio of $C_2F_4/C_3H_6$ (additional charge), concentrations of iron ion and EDTA and a rate of the aqueous solution of $CH_2(OH)SO_2Na$ (8.7 wt.%, without NaOH) and a time for the copolymerization as shown in Table 2, each copolymerization was carried out. (In Examples 6 and 7, NaOH was not incorporated). The results are shown in Table 2. The resulting latex had a pH of 8.1 (Example 6) and 8.2 (Example 7).

TABLE 2

|  | Example 6 | Example 7 |
| --- | --- | --- |
| Molar ratio of $C_2F_4C_3H_6$ (initial charge) | 85/15 | 93/7 |
| Molar ratio of $C_2F_4/C_3H_6$ (additional charge) | 55/45 | 56.5/43.5 |
| Concentrations of iron ion and EDTA (m mol/l.) | 0.54 | 0.18 |
| Feed rate of aqueous solution of $CH_2(OH)SO_2Na$ (ml./hr.) | 6.0 | 9.3 |
| Polymerization time (hr.) | 4.0 | 8.5 |
| Yield of polymer (g.) | 258 | 550 |
| [η]*/molecular weight | 0.80/ 1.33 × 10$^5$ | 0.95/ 1.8 × 10$^5$ |
| $C_2F_4$ component in polymer (mol %) | 54.8 | 56.2 |

Note:
*[η] Intrinsic viscosity in tetrahydrofuran at 30° C.

EXAMPLE 8

In the autoclave used in Example 5, 1014 g. of deionized water, 116 g. of tert-butanol, 5.8 g. of $C_8F_{17}COONH_4$, 34.8 g. of $Na_2HPO_4.12H_2O$ and 2.5 g. of NaOH were charged and then, ammonium persulfate was added at a ratio of 44 m mol/l. An aqueous solution of $FeSO_4.7H_2O$ and EDTA was added to give ratios of 0.18 m mol/l. of $FeSO_4.7H_2O$ and 0.18 m mol/l. of EDTA.

In accordance with the process of Example 5, the monomers were fed at a molar ratio of $C_2F_4/C_3H_6$ of 93/7 and $CH_2(OH)SO_2Na$ was fed at a rate of 1.6 g./hr. and a molar ratio of $C_2F_4/C_3H_6$ for the additional charge of the monomers was 56.5/43.5, and a copolymerization was carried out at 25° C. under a pressure of 25 kg./cm$^2$. After 1.3 hours for the copolymerization, a latex having a concentration of the polymer of 11.8 wt.% was obtained at a selectivity of 99% and 155 g. of the polymer was separated. An average copolymerization velocity was 100 g./l.hr. The resulting latex was a stable white latex. The polymer separated by the salting-out was a white spongy polymer having a $C_2F_4$ content of 56.5 mol % and a molecular weight of 195,000.

EXAMPLE 9

In accordance with the process of Example 5 except that glycidyl vinyl ether (GVE) was added as a third monomer at a ratio of 2 mol % based on the total monomers and 40% of tert-butanol was substituted by sec-butanol for the adjustment of a molecular weight of the polymer, a copolymerization was carried out. GVE was continuously fed during the copolymerization by a pressure resistant constant volumetric pump to give said ratio. After 3.6 hours for the copolymerization, a latex having a concentration of the polymer of 14.6 wt.% was obtained and 200 g. of the polymer was separated. According to an NMR analysis, the polymer had 56 mol % of $C_2F_4$ component, 42 mol % of $C_3H_6$ component and 2 mol % of GVE. The polymer had an intrinsic viscosity of 0.42 (in tetrahydrofuran at 30° C.).

EXAMPLE 10

In accordance with the process of Example 5 except that 17.4 g. of $C_{12}H_{25}SO_4Na$ was used instead of $C_8F_{17}CO_2NH_4$ and that the aqueous solution of $CH_2(OH)SO_2Na$ was fed at a rate of 9.4 ml./hr., a copolymerization was carried out for 6.5 hours. As a result, a latex of 27.1% concentration and 99.7% selectivity (percent of the amount of the copolymer obtained in latex form to the total copolymer yield), and copolymer yield of 428 g., which corresponded to the copolymerization velocity of 57 g./l.hr. were obtained. The copolymer eventually had a molecular weight of 105,000 and a $C_2F_4$ content of 56.0 mol %.

REFERENCE 3

A referential copolymerization was carried out in accordance with Example 10 except that no tert-BuOH was used. The rate of $CH_2(OH)SO_2Na$ feeding was 21.5 ml./hr., which produced a latex of 22.0% concentration and 97.0% selectivity, and polymer yield of 325 g. corresponding to the copolymerization velocity of 23.5 g./l.hr. after 12.0 hours of copolymerization. The copolymer had a molecular weight of 57,000 and a $C_2F_4$ content of 57.5 mole %.

REFERENCE 4

A referential polymerization was carried out in accordance with Reference 3 except that 35 g. of tert-BuOH was added. The copolymerization resulted in a latex of 16.8% concentration and 97.5% selectivity, and copolymer yield of 264 g. corresponding to 28.6 g./l.hr. of copolymerization velocity after 8 hours. The copolymer had a molecular weight of 66,000 and a $C_2F_4$ content of 57.0 mole %.

REFERENCES 5 TO 7

Three referential copolymerizations were carried out in accordance with Example 5, except that no tert-BuOH, polyvinyl alcohol and ethyl alcohol were added, respectively. The identifying copolymerization conditions and results are listed in Table 3.

TABLE 3

| Additive | Ref. 5 none | Ref. 6 polyvinyl alcohol 116 g | Ref. 7 ethyl alcohol 116 g |
|---|---|---|---|
| Feed rate of aqueous solution of $CH_2(OH)SO_2Na$ (8.7%) | 20.5 ml./hr. | 14.2 ml./hr | 10.4 ml./hr. |
| Copolymerization time (hr.) | 16.0 hr. | 12.0 hr. | 12.0 hr. |
| Concentration of latex | 22.5% | 11.3% | 21.4% |
| Selectivity of latex | 95.7% | 90.3% | 97.2% |
| Yield of copolymer (g) | 335 | 173 | 315 |
| Copolymerization velocity | 18.1 g/l. hr. | 11.8 g/l. hr. | 22.7 g/l. hr. |
| Latex pH | 8.4 | 8.6 | 8.3 |
| Molecular weight of copolymer | insoluble | 66,000 | 72,000 |
| $C_2F_4$ content in copolymer (mol %) | 62.3 | 55.9 | 56.8 |

EXAMPLE 11

A copolymerization was carried out in accordance with Example 5 except that 174 g. of tert-butanol was used as additive. As a result, a latex of 23.5% concentration and 99.6% selectivity, and copolymer yield of 398 g. corresponding to the copolymerization velocity of 54.7 g./l.hr. were obtained after 6 hours copolymerization under a feeding rate of 28.6 ml./hr. of $CH_2(OH)SO_2Na$ (8.7%) plus NaOH (1.0%) aqueous solution. The resulting copolymer had the molecular weight of 198,000 and a $C_2F_4$ content of 56.3 mol %.

EXAMPLE 12

In accordance with the process of Example 1 except varying the temperature for the copolymerization from 25° C. to 10° C., a copolymerization was carried out. As a result, a polymer having a molecular weight of 150,000 and a molar ratio of $C_2F_4/C_3H_6$ component of 55/45 was obtained at a copolymerization velocity of 35 g./l.hr.

We claim:

1. A process for preparing a propylene-tetrafluoroethylene copolymer, comprising; copolymerizing tetrafluoroethylene and propylene in a molar ratio ranging from 95/5 to 40/60 in an aqueous medium containing tertiary butanol ranging from 5 to 30 wt.%, an emulsifier ranging from 0.01 to 10 wt.% and a redox catalyst system of (1) a water soluble persulfate, (2) a water soluble iron salt, (3) a hydroxymethanesulfinate and (4) ethylenediamine-tetraacetic acid or salt thereof at a pH of 8 to 10.5 and at a temperature of 0° to 50° C.

2. The process of claim 1, wherein said hydroxymethanesulfinate is an alkali metal salt.

3. The process of claim 1, wherein said iron salt is ferrous sulfate, ferric sulfate, ferrous nitrate, ferric nitrate, ferrous chloride, ferric chloride, ammonium ferrous sulfate or ammonium ferric sulfate.

4. The process of claim 1, wherein the concentration of redox catalyst in the aqueous medium ranges from 0.001 to 5 wt.%.

5. The process of claim 1, wherein the concentration of said persulfate in said aqueous medium ranges from 1 to 50 m mole/liter, the concentration of both the iron salt and ethylenediaminetetraacetic acid or salt thereof ranges from 0.05 to 5 m mole/liter and the concentration of said hydroxymethanesulfinate ranges from 0.5 to 50 m mole/liter.

6. The process of claim 1, wherein the pressure during copolymerization is less than 100 kg/cm².

7. The process of claim 6, wherein said pressure ranges from 5–80 kg/cm².

8. The process of claim 1, wherein the pH of said reaction medium ranges from 8.5 to 10.5.

9. The process of claim 1, wherein the temperature of polymerization ranges from 5°–45° C.

10. The process of claim 1, wherein said emulsifier is a polyfluoroaliphatic carboxylic acid, a perfluoroaliphatic carboxylic acid, polyfluorochloroaliphatic carboxylic acid, a water-soluble salt of any one of said carboxy acids, a perfluorochloroaliphatic carboxy acid, a phosphate or sulfate of a polyfluoroalcohol, a sulfate of a higher fatty alcohol or a water-soluble salt of an aromatic sulfonic acid.

11. The process of claim 10, wherein the concentration of said emulsifier in the reaction medium ranges from 0.1 to 5 wt%.

12. The process of claim 1, wherein said copolymerization medium further comprises at least one of a pH regulator, a buffering agent and a chain transfer agent.

* * * * *